US008185967B2

(12) United States Patent
Levy

(10) Patent No.: US 8,185,967 B2
(45) Date of Patent: *May 22, 2012

(54) METHOD AND APPARATUS FOR CONTENT MANAGEMENT

(75) Inventor: Kenneth L. Levy, Stevenson, WA (US)

(73) Assignee: Digimarc Corporation, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 12/493,972

(22) Filed: Jun. 29, 2009

(65) Prior Publication Data

US 2010/0169984 A1      Jul. 1, 2010

Related U.S. Application Data

(63) Continuation of application No. 11/671,291, filed on Feb. 5, 2007, now Pat. No. 7,555,785, which is a continuation of application No. 11/080,352, filed on Mar. 14, 2005, which is a continuation of application No. 09/522,312, filed on Mar. 9, 2000, now Pat. No. 6,868,497.

(60) Provisional application No. 60/123,587, filed on Mar. 10, 1999.

(51) Int. Cl.
*G06F 11/00* (2006.01)

(52) U.S. Cl. .......................................... 726/34

(58) Field of Classification Search ...................... 726/34
See application file for complete search history.

(56) References Cited

U.S. PATENT DOCUMENTS

| | | | |
|---|---|---|---|
| 4,218,738 A | 8/1980 | Matyas et al. | |
| 4,528,588 A | 7/1985 | Lofberg | |
| 4,528,643 A | 7/1985 | Freeny | |
| 4,827,508 A | 5/1989 | Shear | |
| 4,888,798 A | 12/1989 | Earnest | |
| 4,941,175 A | 7/1990 | Enescu et al. | |
| 4,977,594 A | 12/1990 | Shear | |
| 4,999,806 A | 3/1991 | Chernow et al. | |
| 5,023,907 A | 6/1991 | Johnson et al. | |
| 5,050,213 A | 9/1991 | Shear | |
| 5,103,476 A | 4/1992 | Waite | |
| 5,113,518 A | 5/1992 | Durst et al. | |
| 5,138,712 A | 8/1992 | Corbin | |
| 5,182,770 A | 1/1993 | Medveczky et al. | |
| 5,319,705 A | 6/1994 | Halter | |
| 5,321,841 A | 6/1994 | East | |

(Continued)

OTHER PUBLICATIONS

Choudhury et al., "Copyright Protection for Electronic Publishing Over Computer Networks," 8302 IEEE Network 9, No. 3 (1995).

(Continued)

*Primary Examiner* — Jacob Lipman
(74) *Attorney, Agent, or Firm* — Digimarc Corporation

(57) ABSTRACT

The present application relates generally to content management (e.g., managing audio and video items in portable devices). One claim recites a method comprising: utilizing electronic memory housed in a portable device, maintaining a listing of up to N identifiers associated with previously accessed audio or video items, where N is an integer, and where each previously accessed audio or video item has an identifier associated therewith; utilizing a programmed electronic processor housed in the portable device, i) restricting access to a new audio or video item if an identifier associated with the new audio or video item is one of the N identifiers associated with the previously accessed audio or video items, or ii) limiting a number of content items each with a different user identifier associated therewith that can be accessed in a certain amount of time. Of course, other claims and combinations are provided as well.

20 Claims, 1 Drawing Sheet

U.S. PATENT DOCUMENTS

| | | |
|---|---|---|
| 5,410,598 A | 4/1995 | Shear |
| 5,428,606 A | 6/1995 | Moskowitz |
| 5,428,731 A | 6/1995 | Powers, III |
| 5,464,997 A | 11/1995 | Watanabe |
| 5,473,692 A | 12/1995 | Davis |
| 5,495,411 A | 2/1996 | Ananda |
| 5,548,645 A | 8/1996 | Ananda |
| 5,553,143 A | 9/1996 | Ross et al. |
| 5,579,479 A | 11/1996 | Plum |
| 5,613,004 A | 3/1997 | Cooperman |
| 5,617,119 A | 4/1997 | Briggs et al. |
| 5,629,980 A | 5/1997 | Stefik et al. |
| 5,634,012 A | 5/1997 | Stefik et al. |
| 5,636,276 A | 6/1997 | Brugger |
| 5,638,443 A | 6/1997 | Stefik et al. |
| 5,646,997 A | 7/1997 | Barton |
| 5,646,999 A | 7/1997 | Saito |
| 5,652,714 A | 7/1997 | Peterson et al. |
| 5,657,462 A | 8/1997 | Brouwer et al. |
| 5,699,526 A | 12/1997 | Siefert |
| 5,715,403 A | 2/1998 | Stefik |
| 5,721,788 A | 2/1998 | Powell et al. |
| 5,734,119 A | 3/1998 | France et al. |
| 5,734,719 A | 3/1998 | Tsevdos |
| 5,745,569 A | 4/1998 | Moskowitz et al. |
| 5,748,956 A | 5/1998 | Lafer |
| 5,765,152 A | 6/1998 | Erickson |
| 5,765,176 A | 6/1998 | Bloomberg |
| 5,801,687 A | 9/1998 | Peterson et al. |
| 5,822,432 A | 10/1998 | Moskowitz et al. |
| 5,828,485 A | 10/1998 | Hewlett |
| 5,845,281 A | 12/1998 | Benson |
| 5,848,424 A | 12/1998 | Scheinkman et al. |
| 5,852,673 A | 12/1998 | Young |
| 5,875,249 A | 2/1999 | Mintzer et al. |
| 5,912,972 A | 6/1999 | Barton |
| 5,915,019 A | 6/1999 | Ginter |
| 5,917,912 A | 6/1999 | Ginter et al. |
| 5,920,861 A | 7/1999 | Hall et al. |
| 5,920,878 A | 7/1999 | DeMont |
| 5,926,822 A | 7/1999 | Garman |
| 5,930,369 A | 7/1999 | Cox et al. |
| 5,940,504 A | 8/1999 | Griswold |
| 5,943,422 A | 8/1999 | Van Wie et al. |
| 5,974,141 A | 10/1999 | Saito |
| 5,983,218 A | 11/1999 | Syeda-Mahmood |
| 5,991,876 A | 11/1999 | Johnson et al. |
| 5,995,625 A | 11/1999 | Sudia |
| 6,021,196 A | 2/2000 | Sandford et al. |
| 6,044,182 A | 3/2000 | Daly et al. |
| 6,049,627 A | 4/2000 | Becker et al. |
| 6,061,793 A | 5/2000 | Tewfik et al. |
| 6,182,218 B1 | 1/2001 | Saito |
| 6,185,683 B1 | 2/2001 | Ginter |
| 6,226,618 B1 | 5/2001 | Downs et al. |
| 6,233,684 B1 | 5/2001 | Stefik |
| 6,236,971 B1 | 5/2001 | Stefik |
| 6,398,245 B1 | 6/2002 | Gruse |
| 6,574,609 B1 | 6/2003 | Downs |
| 6,629,138 B1 | 9/2003 | Lambert et al. |
| 6,868,497 B1 | 3/2005 | Levy |
| 7,555,785 B2 | 6/2009 | Levy |
| 2001/0004736 A1 | 6/2001 | Hirano |
| 2001/0008557 A1 | 7/2001 | Stefik |
| 2001/0026618 A1 | 10/2001 | Van Wie |
| 2001/0032312 A1 | 10/2001 | Runje |
| 2001/0034835 A1 | 10/2001 | Smith |
| 2001/0037378 A1 | 11/2001 | Hirayama |
| 2001/0041061 A1 | 11/2001 | Nakagawa |
| 2001/0042043 A1 | 11/2001 | Shear |
| 2001/0051996 A1 | 12/2001 | Cooper et al. |
| 2002/0002468 A1 | 1/2002 | Spagna |
| 2002/0007456 A1 | 1/2002 | Peinado |
| 2002/0013772 A1 | 1/2002 | Peinado |
| 2002/0019814 A1 | 2/2002 | Ganesan |
| 2002/0048369 A1 | 4/2002 | Ginter |
| 2002/0059238 A1 | 5/2002 | Saito |
| 2002/0062252 A1 | 5/2002 | Van Zoest |
| 2002/0065780 A1 | 5/2002 | Barritz |
| 2002/0106082 A1 | 8/2002 | Kori et al. |
| 2002/0107803 A1 | 8/2002 | Lisanke |
| 2002/0112171 A1 | 8/2002 | Ginter |
| 2002/0188570 A1 | 12/2002 | Holliman |
| 2003/0005135 A1 | 1/2003 | Inoue et al. |
| 2003/0069749 A1 | 4/2003 | Shear et al. |
| 2003/0191719 A1 | 10/2003 | Ginter et al. |
| 2004/0103305 A1 | 5/2004 | Ginter et al. |
| 2005/0216513 A1 | 9/2005 | Levy |

OTHER PUBLICATIONS

Microsoft Press, Microsoft Windows NT Workstation Resource Kit, 1996.

"Multimedia Mixed Object Envelopes Supporting a Graduated Fee Scheme via Encryption," IBM Technical Disclosure Bulletin vol. 37, No. 03, pp. 413-417, Mar. 1994.

Sibert et al., "DigiBox: A Self-Protecting Container for Information Commerce," Electronic Publishing Recourses, Inc., originall published in the Proceeding of the First USENIX Workshop on Electronic Commerce, Jul. 1995.

Erickson, "A Copyright Management System for Networked Interactive Multimedia," Proc. of the Dartmouth Institute for Advanced Graduate Studies (DAGS'95), Jun. 1995.

Erickson, "Can Fair Use Survive Our Information-based Future," Dartmouth Interactive Media Lab Technical Report, 1995.

Griswold, "A Method of Protecting Copyrights on Networks," Proc. Technological Strategies for Protecting Intellectual Property in the Networked Multimedia Environment, 1994.

Perritt, "Permission Headers and Contract Law," Proc. Technological Strategies for Protecting Intellectual Property in the Networked Multimedia Environment, 1994.

Upthegrove, "Intellectual Property Header Descriptors: A Dynamic Approach," Proc. Technological Strategies for Protecting intellectual Property in the Networked Multimedia Environment, 1994.

Jul. 23, 2008 Amendment; Mar. 7, 2008 Requirement for Restriction, all from assignee's U.S. Appl. No. 11/080,352 (published as US 2005-0216513 A1).

Nov. 22, 2004, Notice of Allowance; Jul. 15, 2004 Amendment; Jul. 6, 2004 non-final Office Action; Jun. 2, 2004 Amendment Accompanying RCE; May 28, 2004 Advisory Action; May 4, 2004 Amendment; Apr. 21, 2004 Advisory Action; Mar. 29, 2004 Amendment; Mar. 18, 2004 final Office Action; Feb, 20, 2005 Amendment; and Dec. 1, 2003 non-final Office Action, all from assignee's U.S. Appl. No. 09/522,312 (now U.S. Patent No. 6,868,497).

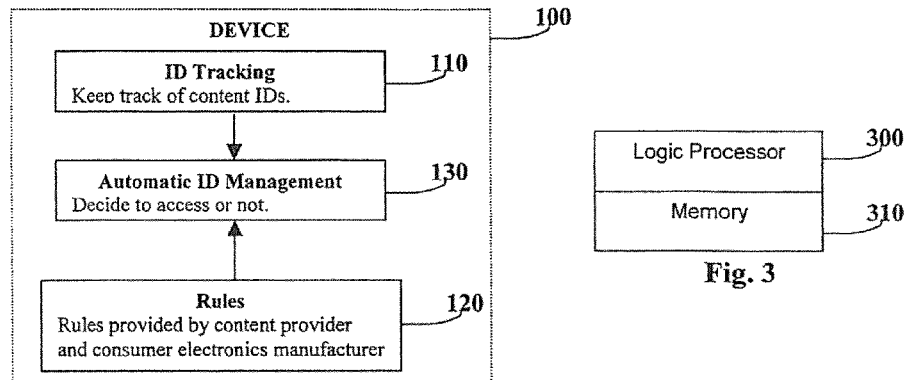
Fig. 1
Fig. 3
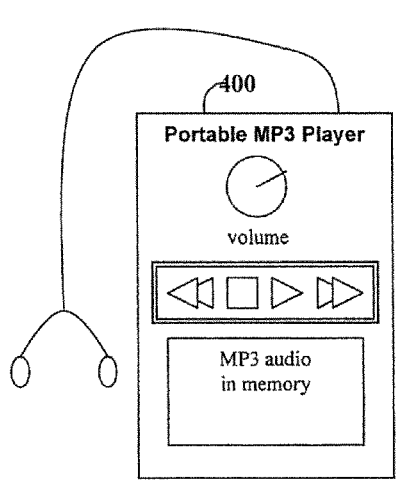
Fig. 4
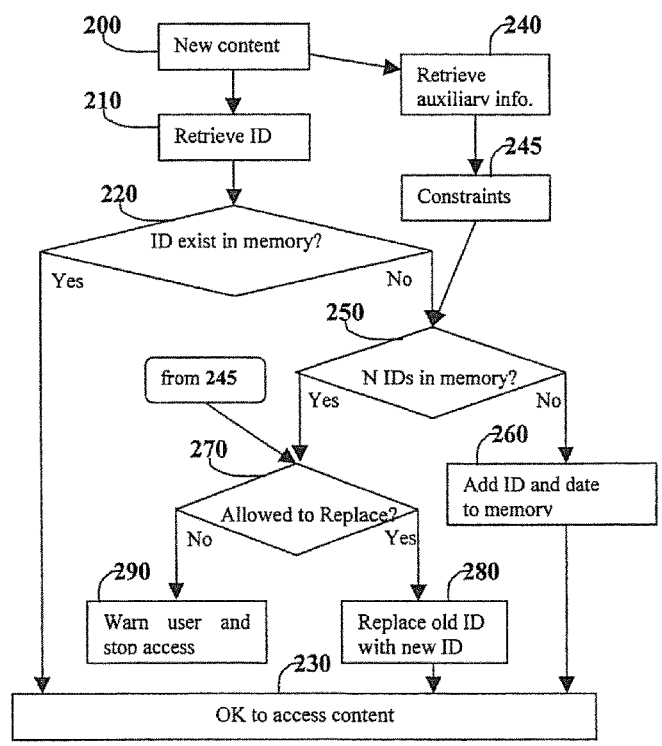
Fig. 2

METHOD AND APPARATUS FOR CONTENT MANAGEMENT

RELATED APPLICATION DATA

This application is a continuation of U.S. patent application Ser. No. 11/671,291, filed Feb. 5, 2007 (U.S. Pat. No. 7,555,785), which is a continuation of U.S. patent application Ser. No. 11/080,352, filed Mar. 14, 2005 (published as US 2005-0216513 A1), which is a continuation of U.S. patent application Ser. No. 09/522,312, filed Mar. 9, 2000 (now U.S. Pat. No. 6,868,497), which claims the benefit of U.S. Provisional Patent Application No. 60/123,587, filed Mar. 10, 1999. Each of these patent documents is hereby incorporated herein by reference.

BACKGROUND OF THE INVENTION

With the influx of digital compression schemes, digital media copiers, digital playing devices, and the Internet, it has become relatively simple to illegally copy and distribute digital content. Therefore, content providers want to allow only the person who bought content to access (i.e. play, copy or record) that content. One way to do this is to provide content that contains an ID, and lock the ID to the consumer, the rendering device or the storage unit. However, these existing solutions of how to use the ID produce unreasonable burdens for consumers.

One existing solution, known as user-binding, requires a person to carry an ID-card and/or remember a personal identification number (PIN) to access the content, similar to the way bank ATM machines work. The consumer has accepted this solution in order to access money in the bank, a situation where security is an advantage to the consumer too. However, it is doubtful that consumers will accept this requirement to access content, for example, play audio on a car stereo. In addition, when a group of people are sharing content, such as music, the process of each person having to scan a card before listening to their music is obtrusive. Finally, this solution requires data that links the ID to the user, so PINs and/or ID-cards can be produced. This data means the user's privacy has been compromised.

Another existing solution restricts playing of the content to one device, known as player-binding. This solution means your friend's music will not play in your car stereo, neither will your movie play at his house. This solution is not only inconvenient to the consumer, but also reduces the sale of content since many people buy content after playing or viewing it with their friends.

A final solution links the content to the storage unit, known as media-binding. The storage unit includes but is not limited to a magnetic hard drive, optical disk or electronic memory. This solution becomes cumbersome when the content should be allowed to move between different storage unit types. For example, a user, Joe, may want to play his audio from his computer's hard drive over his home stereo, or have the audio in his car or on a jog as portable electronic memory. However, with this media-binding solution, this audio can only be played in one place, and to move it from Joe's stereo to his car, he has to remember to where it was "checked out", otherwise, piracy cannot be controlled. Importantly, he can't just listen to it from each place as desirable to the consumer.

SUMMARY OF THE INVENTION

The object of the invented process and apparatus ease the fashion in which consumers legitimately access protected content while controlling piracy. The basic concept is that the content contains an ID that locks it to a particular user or broadcast and the rendering device automatically determines whether the content can be accessed based upon the current and previously rendered IDs and rules. This invention should result in increased sales of content for the content providers.

The invented process involves the rendering device keeping track of the IDs contained in both the current and previously accessed content. This allows the rendering device to control access to new content based upon the new content's ID, the rules provided with the content (by the content providers) and/or within the device, and the IDs from previously rendered content by the device.

The ID may be linked to the user or the broadcast. User IDs work well for content that is sold for a user's continued use, whereas broadcast IDs work well for content recorded by the user from a broadcast.

An example implementation of the invented process is as follows. For user-linked content, the rendering device includes constraints that limit the number of content tracks with different user IDs that can be accessed in a certain amount of time, possibly influenced by the number of times content with each user ID has already been accessed. For broadcast content, broadcast IDs and the optionally included rules can be used to limit rendering or copying of each broadcast. In other words, with broadcast IDs, the limits are based upon date or number of times that ID is played, not on the total number of broadcast IDs.

More specifically, a portable MP3 player can keep track of each song's user ID, and if the previously played songs contain more than N different user IDs, the player decides if it can replace an old user ID with the new one due to the old user ID's date and number of times songs with that ID have been played. Similarly, if a broadcast ID is contained in memory, the MP3 player notes that the user has played the audio X times and Y times is allowed by the broadcast, or the date is past the broadcast's allowable usage date.

To this end, it is easy for the consumer to use the device, as he/she is not required to posses an ID card. In addition, there is no need for a global database linking the user to the ID; thus, the user's privacy is not compromised. For example, if a user looses his/her ID, it can be obtained from previous content. However, the user or broadcast ID can be kept secret and other privacy methods can be used with this invention. Most importantly, access to the media is limited, as the content providers wish, but the user is not inconvenienced.

The apparatus to implement this process includes a logic processor and memory, where it is desirable if the memory maintains its state when the device is without power. Most devices will already contain logic processors for rendering the content, and this process may be implemented on those processors and share time cycles with the other responsibilities of that processor. Importantly, the cost of the hardware to implement this process is minimal since the process is so simple, as desired by the device manufacturers.

BRIEF DESCRIPTION OF THE DRAWINGS

FIG. 1 is an overview of the process of automatic ID management.

FIG. 2 is the pseudo-code for implementing an exemplar automatic ID management process.

FIG. 3 is the apparatus to implement automatic ID management.

FIG. 4 is a portable MP3 audio player containing the apparatus.

DETAILED DESCRIPTION

Lets begin with some definitions. The rendering device is the device that can play, view, record or perform a similar action upon the data. The rendering device can provide any type of perceived data, including but not limited to images, audio and video. If the rendering device has a portable section, such as with a MP3 player, the loader, which puts the content onto the rendering device, is considered as part of the rendering device. The ID may be a user or broadcast ID. For example, many MP3 players can also record broadcasts, and these broadcasts will, in the future, contain embedded broadcast IDs, possibly as watermarks or header data with digital broadcasts. Content refers to the desired audio, video, image, or other relevant perceived data. Content providers include but are not limited to record labels, movie studios, and independent artists. The ID may be embedded within the content such as bits in the header file or a watermark, or the ID can be linked to the encryption and decryption of the content. Finally, this automatic ID management may be used in conjunction with other methods, such as media-binding.

FIG. 1 displays an overview of the automatic ID management process. In the process, the rendering device 100 keeps track of the IDs contained within the content it has previously accessed (box 110). The rules 120 may be provided in the device hardware and/or contained with the content. The rules 120 decide whether or not the device can access the new content based upon its ID (box 130).

If the rendering device has a portable section, such as with a MP3 player, the loader, defined above as part of the rendering device, can be used to lower the amount of memory required within the portable section, thus lowering its costs. This means that with a portable rendering device, the portable section may contain all of the memory and processing hardware (described in detail below) required to perform this automatic ID handling, or the hardware may be split between the loader and portable section. For example, when a computer uses a software loader to put MP3 files onto a portable MP3 player, the loader may store all the information about IDs on the computer and all the rendering device needs to do is count the number of times each song is played and maintain date information for its current list of content.

FIG. 2 displays the pseudo-code to implement an example of the process. In this example, the rules 120 include constraints 245, which are contained within the content as specified by the content provider, as well as default rules contained with the rendering device hardware. The constraints 245 are retrieved from the content 200 (box 240). The constraints 245 may limit the number of content tracks with different IDs that a device can access during a set time-period. The constraints 245 may also change the time-period an ID is stored dependent upon the number of times content with a specific ID was accessed. The constraints 245 may be embedded within the content or attached as a header information or a linked file.

For ease-of-use, it is better to not change these constraints per song because it may confuse the user. Ideally, the constraints should be agreed upon and set in the rendering device. However, including the rules in the content is a viable option for this invention.

Before describing the details of this exemplar process, it is important to understand the apparatus that implements the automatic ID management process (FIG. 3). The hardware includes a logic processor 300 and a memory 310. The logic processor 300 may be defined as the equivalent of a digital signal processor (DSP), general-purpose central processing unit (CPU), or a specialized CPU, including media processors. A likely DSP chip is one of the Texas Instruments TMS320 product line. A CPU could include one of Intel's Pentium line or Motorola/IBM's PowerPC product line. The design of code for controlling logic processor 300 is simple for someone familiar with the state of the art given the above pseudo-code and description.

In addition, a person familiar with the state of the art could implement the logic processor 300 using analog and digital circuitry, either separate or in an application specific integrated circuit (ASIC). The analog and digital circuitry could include any combination of the following devices: digital-to-analog converters (D/A), comparators, sample-and-hold circuits, delay elements, analog-to-digital converters (A/D), and programmable logic controllers (PLC).

The memory 310 stores the information required by rules 120, such as IDs, last play date, and the number of times that content with each ID has been accessed. Memory 310 may consist of standard computer random access memory (RAM). It is also desirable if memory 310 maintains this information even without power in the rendering device, perhaps but not limited to using ROM with backup and chargeable battery power, or memory that is stable without power, such as EPROM. As discussed above, memory 310 may consist of two separate modules when using a portable section and loader.

Now, back to a detailed description of the example process. It begins with the device 100 receiving new content 200. From the content 200, an ID 210 is retrieved. The ID 210 is checked to see if it is a user or broadcast ID (box 215).

For user IDs, the following happens. If the ID 210 already exists in the memory 310 of device 100 (box 220), the play count and last access date are updated (box 222) and the content 200 is rendered (box 230). If the ID 210 does not exist in memory 310 (box 220), the rules 120 are checked. If another ID can exist in memory 310 (box 250), ID 210 and the current date are added to the memory 310 (box 260) and the content is rendered (box 230). If another ID cannot be added, the rules 120 are checked to see if any existing IDs can be replaced because they are too old (box 270). If any IDs can be replaced, the old ID is replaced with ID 210 (box 280) and the content is rendered (box 230). If no IDs can be replaced, the user may be warned and access to content 200 is denied or limited (box 290). The user may also be presented with a link to buy the content (box 290).

More specifically, the rules may allow a device to store 10 IDs, and IDs can be replaced if they have not been accessed for a week.

In addition, the number of times an ID has been rendered could be used to determine whether or not to replace the old ID with a new one (box 270). This count value could influence the time period an ID is held is memory 310; thus allowing ID 210 to replace a stored ID (boxes 270 and 280). For example, if content associated with the stored ID has not been accessed in a week, it can be replaced. Conversely, if content associated with the stored ID has been played at least 7 times, it should be held for at least a month since its last access.

There are many other simple rules that can be designed to meet the specific needs of the content provider. Some may involve using difference equations to decide whether or not an ID can be replaced. For example, the count for an ID can be reduced by one each day and incremented by one for each rendering of content containing the ID, and the ID can be replaced (box 270) if the count is zero or less, or the date of last access is over a week.

For broadcast IDs, the following happens. The ID 210 is examined to see if it already exists in memory 310 (box 255). If not, the ID 210 and current date are added to the rendering devices memory 310 (box 265), and the content is rendered (box 230). If the ID 210 does exist in memory, the play count, record date and/or last access date are checked to see if the content can be rendered (box 275). The broadcast may allow only two renders, or one week of rendering, or rendering until a specific date. If the broadcast is allowed to be rendered, the count and last access date are updated (box 285) and the content is accessed (box 230). If the broadcast is not allowed to be rendered, the user is notified, the access is limited and a link to buy the broadcast or similar content may be provided, if applicable (box 295).

In addition, the device should probably have some way to reset all of the information, such as IDs, date and count. The reset function may require a password code that is pseudo-random, thus requiring the user to contact support to reset the device. For example, the password may depend upon the day and year and obtained from an automation system. The reset button may also delete all the current content as well as ID information. This allows people to use one portable player with many friends at a party, but the loss of content will discourage piracy since it will be cumbersome.

FIG. 4 shows a portable MP3 player 400 that contains the described apparatus implementing the described pseudo-code. In this case, the logic processor 300 could be a separate processor, or share access with the processor that decompresses the audio. The device also contains the necessary memory 310 to store the required information, such as ID, data and count, possibly even when the player 400 is without power. The device may share this memory with a software loader.

Finally, in any rendering device, the logic processor 300 could be a separate processor or share time with the processor handling content for the device, such as compressing or decompressing digital content.

In summary, the main advantage of this invention is that it will be easier for consumers to access protected content than with prior-art ID methods and apparatus. In addition, it provides the content protection desired by content providers, and minimal increase in cost for rendering devices as desired by consumer electronic manufacturers.

The foregoing descriptions of the preferred embodiments of the invention have been presented to teach those skilled in the art how to best utilize the invention. Many modifications and variations are possible in light of the above teaching, such as other simple rules to meet specific content provider goals or combinations of portable and loader sections. To this end, the following claims define the scope and spirit of the invention.

What is claimed is:

1. A method comprising:
utilizing electronic memory housed in a portable device, maintaining a listing of up to N identifiers associated with previously accessed audio or video items, where N is an integer, and where each previously accessed audio or video item has an identifier associated therewith;
utilizing a programmed electronic processor housed in the portable device, i) restricting access to an encountered audio or video item if an identifier associated with the encountered audio or video item is one of the N identifiers associated with the previously accessed audio or video items, or ii) limiting a number of content items each with a different user identifier associated therewith that can be accessed in a certain amount of time.

2. The method of claim 1 where N is decided by rendering rules associated with the encountered audio or video item.

3. The method of claim 1 where N is decided by the portable device.

4. The method of claim 1 wherein N comprises 10 or more.

5. The method of claim 1 where the certain amount of time is decided by the portable device.

6. A portable device comprising instructions stored in memory, said instructions are executable by said portable device to perform the acts of claim 1.

7. A portable device comprising instructions stored in memory, said instructions are executable by said portable device to perform the acts of claim 1.

8. A computer readable media comprising instructions stored thereon to cause a multi-purpose electronic processor to perform the acts of claim 1.

9. The method of claim 1 where at least one of the N identifiers can be replaced if an audio or video item associated with an identifier to be replaced has not been accessed for a certain period of time.

10. The method of claim 9 in which the existing identifier listed in the listing of N identifiers cannot be replaced with an identifier associated with the encountered audio or video item when the audio or video item associated with the existing identifier has been accessed within the certain period of time.

11. The method of claim 9 where the certain period of time is influenced by a number of times the audio or video item associated with the identifier to be replaced has been rendered.

12. A portable device comprising instructions stored in memory, said instructions are executable by said portable device to perform the acts of claim 11.

13. A computer readable media comprising instructions stored thereon to cause a multi-purpose electronic processor to perform the acts of claim 11.

14. The method of claim 11 where if the audio or video item associated with the identifier to be replaced has been rendered at least a predetermined number of times, the identifier is tracked for a longer time relative to other identifiers.

15. A portable device comprising instructions stored in memory, said instructions are executable by said portable device to perform the acts of claim 14.

16. A computer readable media comprising instructions stored thereon to cause a multi-purpose electronic processor to perform the acts of claim 14.

17. The method of claim 9 where the identifier can be replaced dependent upon a difference equation involving an access or rendering count.

18. The method of claim 17 where the access or rendering count for tracked identifiers is decremented or reduced after the expiration of a set time segment, and the identifier also can be replaced if it has a zero count.

19. A portable apparatus comprising:
electronic memory comprising a listing of up to N identifiers associated with previously accessed audio or video content items, where N is an integer, and where each previously accessed audio or video content item has an identifier associated therewith;
an electronic processor programmed for:
i) restricting access to an encountered content item if an identifier associated with the encountered content item is one of the N identifiers associated with the previously accessed audio or video content items, or
ii) limiting a number of content items each with different user identifier associated therewith that can be accessed in a certain amount of time.

20. The portable apparatus of claim 19 in which said electronic memory is operating to restrict access to the encountered audio or video item.

* * * * *